July 22, 1969   J. B. DIXON   3,456,458

CONSTANT VELOCITY JOINTS

Filed May 4, 1967

Inventor
JOHN BELL DIXON
By
Cameron, Kerkam & Sutton
Attorneys

United States Patent Office 3,456,458
Patented July 22, 1969

3,456,458
CONSTANT VELOCITY JOINTS
John Bell Dixon, Woking, England, assignor to The Secretary of State for Defence in Her Britannic Majesty's Government of the United Kingdom of Great Britain and Northern Ireland, London, England
Filed May 4, 1967, Ser. No. 636,137
Claims priority, application Great Britain, May 4, 1966, 19,682/66
Int. Cl. F16d *3/30, 3/42*
U.S. Cl. 64—21                     5 Claims

ABSTRACT OF THE DISCLOSURE

A constant velocity joint for mounting on adjacent ends of two normally aligned shafts comprises a first and a second fork mounted one on each shaft with a ring pivotally connected to the second fork, a cross shaped spider or inner ring is arranged within the aforementioned ring and is pivotally connected to the first fork normally coaxially with the connection between the second fork and the ring and is also pivotally connected to the ring about an axis perpendicular to that of the connection with the first fork; a differential gearing or sliding yoke maintains the pivotal connection between the ring and the spider or inner ring equally inclined to the axes of the forks and shafts.

---

This invention relates to constant velocity joints. Such joints are capable of transmitting uniform angular velocity between two shafts inclined at an angle to one another and connected together by a constant velocity joint.

It is an object of this invention to provide a constant velocity joint which is capable of transmitting a driving torque and constant velocity between two shafts over a wider range of angularity between the shafts than has heretofore been possible.

According to this invention a constant velocity joint for mounting on adjacent ends of two normally aligned shafts, comprises a first and a second fork; a ring of circular or other suitable shape pivotally connected to the second fork; coupling means pivotally connected to the first fork about an axis normally co-axial with the connection between the second fork and the ring, and pivotally connected to the ring with the axis of said such connection between the coupling means and ring perpendicular to the connection between the first fork and the coupling means; and connecting means for maintaining the axis of the conection between the ring and the couplig means equally inclined to the axis of the forks and hence of the shafts when the forks are mounted thereon.

In one form of this invention a constant velocity joint capable of being secured on adjacent ends of two normally aligned shafts includes:— two forks each pivotally connected respectively to one of two concentric rings of circular or other suitable shape, one ring being arranged inside the other ring with the pivotal connections between both forks and their respective rings coplanar and normally coaxial, pivotal connections between the two rings arranged at 90° to the plane containing the pivotal connections between the forks and the rings, and connecting means between the forks which connecting means positively maintains the axis of the pivotal connection between the rings equally inclined to the axes of the forks and shafts upon which the fork can be secured.

Figure 1:
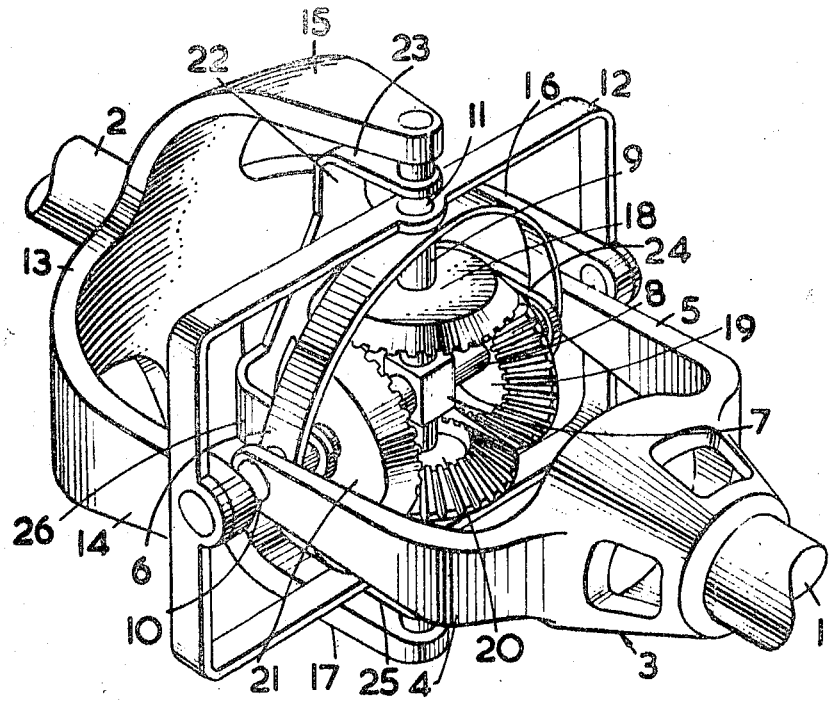
Figure 2:
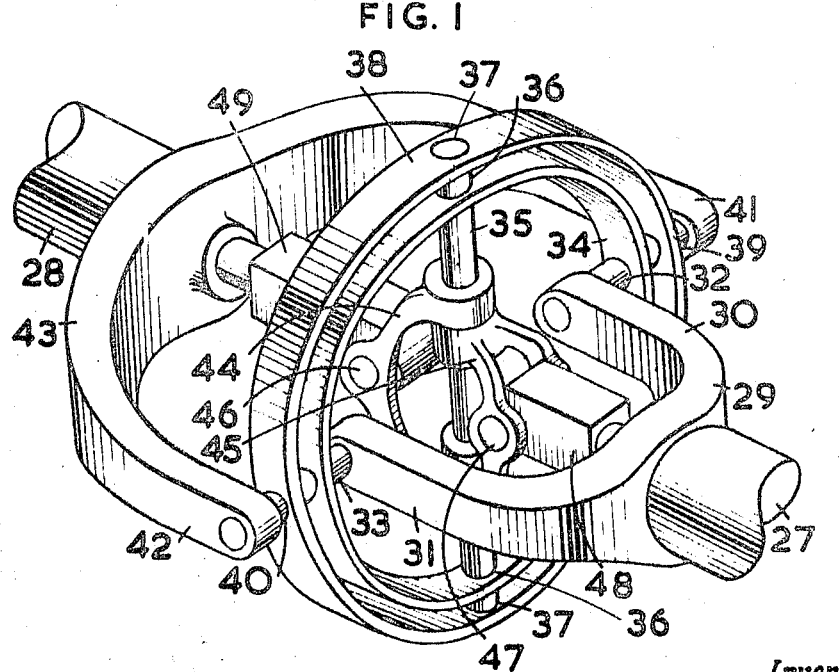

The invention will now be described, by way of example only, in the accompanying drawings of which:

FIGURE 1 is a pictorial view of one form of constant velocity joint according to this invention and FIGURE 2 is a pictorial view of another form of constant velocity joint.

The form of the invention shown in FIGURE 1 will be described mounted on adjacent ends of two normally horizontal and aligned driving and driven shafts 1, 2 respectively. With the shafts 1, 2 in this position the pivotal connections between component parts of the joint lie in a plane transverse of the shaft axis with the pivotal axes lying mutually perpendicular to one another; for ease of description and understanding these pivot axes will be described as horizontal and vertical axes.

A two-armed first or driving fork 3 is mounted on the end of the driving shaft 1 with its two arms, 4, 5 arranged in a horizontal plane and having pivotally mounted therebetween an inner ring 6 coaxial with the driving shaft 1. Inside this ring 6 is located a cross-shaped spider 7 provided with horizontally and vertically disposed shafts 8, 9 respectively. The horizontal shafts 8 pass through diametrically located holes in the inner ring 6 and into bearings 10 near the ends of the arms 4, 5 of the driving fork 3 to form the pivotal connection between the said driving fork 3 and the inner ring 6. The vertical shafts 9 pass through diametrically opposite holes in the inner ring 6 and into bearing 11 in an outer ring 1, concentric with the inner ring 6, to pivotally connect the inner and outer rings 6, 12 together. A second or driven fork 13 provided with four equi-spaced arms 14, 15, 16, 17 is mounted on the driven shaft 2; the arms 14, 16 are arranged in the horizontal plane and the arms 15, 17 in the vertical plane. The two horizontal arms 14, 16 on the driven fork 13 are pivotally connected to the outer ring 12 with the pivot axis coaxial with the pivotal connection between the driving fork 3 and the inner ring 6.

In order to transmit a constant velocity and a torque between the driving and drivein shafts 1, 2 for all inclination of shaft axes, the vertical shafts 9 on the spider 7, i.e. the shafts at 90° to axis of the connections between the inner ring and the driving fork 3, must always be positively maintained at equal inclination to the axes of the driving and driven shafts 1, 2.

This is achieved in this form of the invention by the use of four inter-engaging bevel gear wheels 18, 19, 20, 21 one mounted on each shaft of the spider 7 inside the inner ring 6. The two bevel gears 18, 20 mounted on the vertical shafts 9 of the spider 7 are idlers and are freely rotatable thereon and transmit, and reverse the direction of, motion between the two bevel gears 19, 21 mounted on the hroizontal shafts 8 of the spider 7. The bevel gear 19 is fixed relative to the driving fork 3, and the bevel gear 21 is connected to the driven fork 13 by means of a yoke 22 to which it is nonrotatably fixed. This yoke 22 is formed from a plate having four equi-spaced limbs 23, 24, 25, 26 projecting perpendicularly from one face of the plate. Two opposite limbs 23, 25 are pivotally connected to the vertical arms 15, 17 of the driven fork 13 coaxially with the axis of the vertical spider shaft 9 and the other two limbs 24, 26 are mounted on the horizontal shafts 8 of the spider. It is this latter limb 26 which is connected to the bevel gear 21 on the horizontal shaft 8 of the spider 7 to connect the said bevel gear 21 to the driven fork 13.

If the driving shaft 1 is inclined upwardly in the vertical plane about its connection with the inner ring 6 the bevel gear 19 fixed to the driven fork 3 rotates an equal amount. Since the bevel gear 21 connected to the driven fork 13 remains stationary and since the idler bevel gears 18, 20 connect the two bevel gears 19, 21 on the horizontal shafts 8 of the spider 7, the inner and outer rings 6, 12 rotate half the angular distance rotated by the driving shaft 1. The inner and outer rings 6, 12 are thus equally inclined to both the driving and driven shafts 1, 2.

When the driving and driven shafts 1, 2 are aligned and the driving shaft 1 is moved in a horizontal plane, the inner ring 6 moves with the driving fork 3 and pivots about its connection with the outer ring 12 which remains stationary; the four bevel gears 18, 19, 20, 21 rotate with the inner ring 6 without rotating relative to one another.

Hence, when the driving shaft 1 is rotated about its own axis, the driven shaft 2 always rotates at the same speed for all inclinations of the two shafts 1, 2.

Although the inner ring 6 is shown, for simplicity of drawing, in FIGURE 1 as a thin circular strip it is preferable that the bevel gears 18, 19, 20, 21 are enclosed in a suitably shaped housing to prevent dirt fouling the gear teeth; the inner ring 6 then becomes an integral part of this housing. When such a housing is used the limb 26 of the yoke is mounted on the horizontal shaft 8 of the spider 7 outside the housing but still connected to the bevel gear 21 as before.

In the form of the invention shown in FIGURE 2 adjacent ends of two aligned shafts namely a driving shaft 27 and a driven shaft 28 are connected one to the other by a constant velocity joint. The driving shaft 27 carries, at its end, a two armed first or driving fork 29 provided at its extremities with arms 30, 31 having outwardly directed journals 32, 33 which engage in diametrically opposite holes in an inner ring 34 arranged coaxial with the driving shaft 27 to pivotally connect the driving fork 29 to the inner ring 34. A cross pin 38 is located partly inside the inner ring 34 with its axis at 90° to the axis of the connection between the driving fork 29 and the inner ring 34 and perpendicular to the driving shaft 27 axis, and with the ends of said cross pin 35 passing through diametrically opposite holes 36 in the inner ring 34 and into diametrically opposite holes 37 in an outer ring 38 arranged concentric with the inner ring 34. This outer ring 38 carries coaxial with the connection between the driving fork 29 and the inner ring 34, outwardly directed journals 39, 40 which are received in ends 41, 42 of a second or driven fork 43 secured on the end of the driven shaft 28.

To ensure that both the driving and driven shafts 27, 28 rotate at the same speed whatever the inclination between them the cross pin 35 must always be equally inclined to both the driving and driven shafts 27, 28 axes. This is achieved by two yokes 44, 45 each of which have bores formed therein freely slidable on the cross pin. At equal distances away from the cross pin 35 each yoke 44, 45 is pivotally connected at 46, 47 to a sliding member 48, 49. These sliding members 48, 49 slide in axial bores in the driving and driven shaft 27, 28. When the driving shaft 27 is rotated about its pivotal connection with the inner ring 34 the sliding members 48, 49 slide in their axial bores in the shafts 27, 28 and the yokes 44, 45 move along the cross pin 35 to keep it equally inclined to both the driving and the driven shafts 27, 28 axes.

I claim:

1. A constant velocity joint, for mounting on adjacent ends of two normally aligned shafts, including:
    a first fork (3, 4, 5) and a second fork (13) for mounting on the respective shafts;
    a ring (12) pivotally connected across the ring to the second fork (13);
  wherein the improvement comprises:
    coupling means pivotally connected to the first fork (3, 4, 5) about an axis normally coaxial with the pivotal axis between the second fork (13) and the ring (12), and pivotally connected to the ring about an axis perpendicular to the pivotal axis between the coupling means and the first fork;
    said coupling means comprising:
    a cross shaped spider (7); and
    four shafts (8, 9) carried by the spider and arranged in two coaxial pairs, the ends of two shafts (8) of one pair being pivoted to the first fork (3, 4, 5) and the ends of the two shafts (9) in the other pair pivoted across the ring (12); and
    connecting means for maintaining the pivotal axis between the ring (12) and the coupling means equally inclined to the axes of the forks and hence of the shafts when the forks are mounted thereon;
    said connecting means including a differential gearing (18, 19, 20, 21).

2. A constant velocity joint according to claim 1 wherein the differential gearings (18, 19, 20, 21) is mounted inside the ring (12).

3. A constant velocity joint according to claim 1 comprising:
    four interengaging bevel gears (18, 19, 20, 21) one mounted on each shaft (8, 9) of the spider (7), the two bevel gears (18, 20) mounted on the shafts (9) on which the ring (12) is pivoted being idler gears freely rotatable on the said shafts (9), one (19) of the two bevel gears (19, 21) mounted on the shafts (8) of the spider which are connected to the first fork (3, 4, 5) being restrained against rotation about its own axis relative to the said first fork (3, 4, 5);
    at least one additional arm (15 or 17) on the second fork (13);
    a yoke (22) pivoted to the said additional arm (15 or 17) about an axis perpendicular to the pivotal axis between the ring (12) and the second fork (13);
    the other (21) of the two bevel gears (19, 21) mounted on the shafts (8) of the spider which are connected to the first fork (3, 4, 5) being restrained from rotation about its own axis relative to the yoke (22).

4. A constant velocity joint according to claim 1 in which the coupling means comprises:
    an inner ring (6) arranged centrally within the aforementioned ring (12), the said inner ring (6) being pivotally connected to the first fork (3, 4, 5) about an axis normally coaxial with the pivotal axis between the second fork (13) and the ring (12); and
    the shafts (9) being arranged perpendicular to the pivotal axis between the inner ring (6) and the first fork (3, 4, 5).

5. A constant velocity joint, for mounting on adjacent ends of two shafts, comprising:
    a first fork (3, 4, 5) and a second fork (13) each having a pair of arms;
    a ring (12) pivoted upon the arms of the second fork (13) about a first diametral axis;
    a rectangular cross-shaped spider (7) having two coaxial arms (9) pivoted diametrally to the ring (12) about an axis perpendicular to the first diametral axis, the other two coaxial arms (8) of the spider being pivoted in the arms of the first fork (3, 4, 5);
    four interengaging bevel gears (18, 19, 20, 21) mounted one on each arm of the spider (7), two of said gears (18, 20) being idler gears, a third gear (19) being non-rotatably fixed to the first fork (3, 4, 5) and engaging the two idler gears, and the fourth gear (21) also engaging the two idlers; and
    connecting means non-rotatably attached to the fourth gear (21) for maintaining the plane of the ring (12) and spider (7) equally inclined to both shafts;
    said connecting means comprising a yoke (22) pivoted to the second fork (13) about an axis perpendicular to the aforesaid first diametral axis and non-rotatably fixed to the fourth bevel gear (21).

References Cited

UNITED STATES PATENTS

| | | | |
|---|---|---|---|
| 1,058,878 | 4/1913 | Lowndes | 64—21 |
| 1,562,080 | 11/1925 | Chilton | 64—21 |
| 1,899,170 | 2/1933 | Wainwright | 64—21 |
| 3,036,446 | 5/1962 | Morgenstern | 64—18 |
| 3,260,070 | 7/1966 | Preston | 64—21 |

HALL C. COE, Primary Examiner

U.S. Cl. X.R.

64—18